(12) United States Patent
Synnergren et al.

(10) Patent No.: US 7,876,789 B2
(45) Date of Patent: Jan. 25, 2011

(54) METHOD FOR SYNCHRONIZING THE PRESENTATION OF MEDIA STREAMS IN A MOBILE COMMUNICATION SYSTEM AND TERMINAL FOR TRANSMITTING MEDIA STREAMS

(75) Inventors: Per Synnergren, Lulea (SE); Stefan Wänstedt, Lulea (SE); Ylva Timner, Lulea (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 559 days.

(21) Appl. No.: 11/993,044

(22) PCT Filed: Jun. 23, 2005

(86) PCT No.: PCT/SE2005/001007

§ 371 (c)(1),
(2), (4) Date: Dec. 19, 2007

(87) PCT Pub. No.: WO2006/137762

PCT Pub. Date: Dec. 28, 2006

(65) Prior Publication Data

US 2010/0142412 A1  Jun. 10, 2010

(51) Int. Cl.
*H04J 3/06* (2006.01)
(52) U.S. Cl. .................................. 370/503; 348/515
(58) Field of Classification Search ................ 370/503; 348/423.1, 500, 515
See application file for complete search history.

(56) References Cited

U.S. PATENT DOCUMENTS

| 2003/0128294 A1* | 7/2003 | Lundblad et al. ............ 348/515 |
| 2008/0062315 A1* | 3/2008 | Oostveen et al. ............ 348/500 |
| 2008/0273863 A1* | 11/2008 | Moon et al. ................. 386/126 |

* cited by examiner

*Primary Examiner*—Ricky Ngo
*Assistant Examiner*—Kan Yuen

(57) ABSTRACT

For some mobile communication services, a media stream such as video, will be combined with another media stream such as voice. For example, a user of a first terminal (101) is involved in a voice call over e.g. a circuit switched network (103) with a friend. During the voice call, the user of the first terminal decides to start transmitting another media stream, such as live streamed video, which may be transmitted over a packet switched network (104), to the friend's terminal (102). In such a case there is problem in that the two media streams voice and video may have quite different end-to-end time delays, i.e. the time from a part of the media stream is transmitted from the first user's terminal (101) until that part of the media stream is presented at the friend's terminal (102). Since comments from the first user will be presented to the user's friend earlier than the commented part of the video this will be quite annoying to the friend. To avoid this problem this invention presents the video to the user of the first terminal (101) delayed with a time dependent on the time difference between the end-to-end time delay of video and the end-to-end time delay of voice. Thereby, comments from the user of the first terminal (101) regarding the video will be received at the friend's terminal (102) approximately synchronized with the video.

20 Claims, 4 Drawing Sheets

METHOD FOR SYNCHRONIZING THE PRESENTATION OF MEDIA STREAMS IN A MOBILE COMMUNICATION SYSTEM AND TERMINAL FOR TRANSMITTING MEDIA STREAMS

FIELD OF THE INVENTION

The present invention relates to terminals and methods in a mobile communication system. More particularly, it relates to a method for synchronizing the presentation of media streams in a terminal in a mobile communication system and to a terminal for transmitting such media streams such that they are presented in a synchronized manner in a receiving terminal.

BACKGROUND OF THE INVENTION

Transmission of a video media stream from a first terminal to at least one other terminal will be used in many services in future mobile communication systems. For some services the video media stream will be combined with other media streams, such as voice, i.e. the video stream will be transmitted from a sending terminal to a receiving terminal at least partly simultaneously with the other media stream, e.g. during a voice call between the users of the two terminals. Also, there may be other services when different media streams are transmitted at least partly simultaneously from a sending terminal to a receiving terminal.

An example of such a service is Push-to-Show (PtS) Video. PtS is a so-called combinational service that utilizes an IP Multimedia Subsystem (IMS) as the service layer platform. In the technical specification 3GPP TS 23.279 V1.0.0 published by 3GPP in February 2005, it is further described how PtS is enabled. This document provides the architectural details for using a circuit switched voice call in association with an IMS packet data session. The document provides a detailed description of how circuit switched services and IMS services can be combined into a combinational service. Basically, the PtS service is an enriched phone call. In PtS Video, the enrichment is live-streamed video that is transferred between terminals during the phone call.

If a service is described as a combinational service it also means that the service uses an ordinary circuit switched (CS) channel for voice while the enrichment, in this case the live-streamed video, uses a packet switched (PS) channel. The live-streamed video enrichment is started by just a push of a button on one of the terminals involved in a phone call. This means that PtS Video differs from ordinary video telephony in that PtS offers the possibility of changing service, i.e. going from voice only to video and voice, during an ongoing call.

It is believed that in most PtS sessions, the live-streamed video is sent "one-way" (or simplex) from one user to another in order to enable a "See what I see" type of service. Below is a typical user scenario for PtS Video:

A PtS user is in a store and wants to buy a shirt. Before buying the shirt the PtS user wants a friend's opinion and calls him. When the PtS user gets connected to his friend, the PtS user enables the live-streamed video enrichment by a push of a button. After that the PtS user records the shirt using the in-built video camera in the phone. The live-streamed video is sent to the friend that views the shirt. After having formed an opinion if the PtS user should buy the shirt, the friend gives his opinion using the CS-voice channel.

An issue in the PtS Video scenario is that the voice stream and the video stream is not sent over the same path in the communication system and thus there is a problem of synchronizing the presentation of the voice and the video data streams at the receiving terminal. Since the voice stream and the video stream uses different radio bearers and do not transverse an identical set of nodes in access networks and core networks of the mobile communication system, the flows will have different end-to-end delay characteristics. An end-to-end delay is defined as the time from transmitting a part of a media stream, such as a data packet in a PS media stream, from the sending terminal until that part of the media stream is presented at the receiving terminal. The end-to-end delay would comprise transmission time and buffering time, wherein buffering time is the time a received part of the media stream is stored in a buffer in the receiving terminal before it is presented. The buffering time for CS voice is normally very short, whereas it may be substantially long for PS data, such as video, as will be shown below. Also, the transmission time for CS voice is normally shorter than the transmission time for PS data. The end-to-end time delay may also comprise a buffering time at the sending terminal before the part of the media stream is actually transmitted.

To synchronize the presentation of the two flows at the receiving terminal, by prolonging the transmission time and/or the buffering time of one flow and/or shortening the transmission time and/or the buffering time of the other flow, is difficult. Also, to induce extra delay on a CS voice stream might not be desired, since the experienced CS voice quality is highly dependent on the end-to-end time delay. Also, the PS domain in 2G networks, such as GSM/GPRS and EDGE networks, currently lacks a proper handover mechanism. This means that rather long interruptions of the PS data transfer may happen in normal operation during handovers. The variation of the radio conditions and retransmissions of radio blocks are also factors that contribute to interruptions of the PS data transfer, which results in delay variations or jitter in the PS data transfer. To handle such interruptions the receiving client uses a jitter buffer. This means that an additional buffer delay has to be included in the end-to-end delay of packet switched data, such as live-streamed video, for achieving a good data quality at the receiving terminal.

In order to have a smooth playback of the received PS-video when deploying Push-to-Show over mobile networks, especially 2G networks, it is believed that a quite large buffering is needed in the receiving client. This buffering is needed to overcome the sudden radio outages and delay variations in the PS data transfer explained above. All in all, the end-to-end delay, i.e. the time delay from a packet of the first video stream is transmitted from the sending terminal until the packet is displayed on the screen of the receiving terminal needs to be rather long. At the same time, the end-to-end voice delay is short as it uses a CS-channel that favors constant low delay over successful transmission of radio blocks, i.e. the retransmissions of radio blocks is turned off in CS channels.

Typically, the end-to-end time delay for video is about 2 seconds in a 2G network and the end-to-end time delay for circuit switched voice is about 0.2 seconds. This mismatch may make it difficult for the user of the receiving terminal to follow the conversation if the user of the sending terminal talks about what he is recording, which is something the user of the receiving terminal will see in a few seconds time. This is illustrated by the following example:

PtS User A talks to PtS User B over the phone. PtS User A pushes the PtS button and records a bowling competition between a few of his friends. Every time a friend is throwing the bowling ball, PtS User A comments the style of the friend throwing the ball as well as the reaction of the ball on the lane. However, the PS connection between PtS User A and PtS User B has a fairly long media path delay (maybe several seconds). This may be due to slow retransmissions of the PS data blocks over the air interface, long buffering time in the receiving PtS Client in order to prevent freezing of the played out video stream or congestion in the PS core network. The lack of synchronization of the comments over the CS voice channel and the actual played out video of the friends that are playing bowling is perceived as rather annoying by PtS User B.

However, it is not only in the case of CS voice and PS video that a solution to the synchronization problem is needed. In the future, mobile networks will also offer PS-voice and PS-video services. Therefore, a possible service may be a real-time PS voice call that is enriched with the transmission of a video clip. Here this service is referred to as PtS Clip. The transmission of the video clip may be a so-called progressive download. This means that the receiving user can consume the content of the transmitted file during the transmission of it. An example of using the PtS is shown below:

PtS User A talks to PtS User B over the phone. PtS User A pushes a PtS button and sends a stored video clip to PtS User B. The video clip shows the bowling competition mentioned above. Anyway, PtS User A wants to comment the style used every time a person is throwing the bowling ball. Therefore, the video clip is also presented to PtS User A on the display of his terminal. However, the transfer delay between PtS User A and PtS User B until PtS User B can start watching the video clip at his terminal is fairly long, maybe several seconds. This may be due to slow retransmissions of the PS data blocks over the air interface, long buffering time in the receiving PtS Client in order to prevent freezing of the played out video stream or congestion in the PS core network. The lack of synchronization of the comments presented on PtS User B's terminal as a PS voice call, and the actual play-out of the video clip on PtS User B's terminal is perceived as rather annoying for PtS User B.

Further, the sender may want to synchronize other types of data streams with the receiver. One such example may be a whiteboard session together with a voice call commenting the whiteboard session.

As shown above, there is a need for a solution for synchronizing the presentation of a first media stream, such as video, at a receiving terminal to the presentation of a second media stream, such as voice, at the receiving terminal, when the first media stream has a first end-to-end delay and the second media stream has a second end-to-end delay substantially shorter than the first end-to-end delay. The synchronisation should be made such that the perception for a user of the receiving terminal would be that the information in the first media stream and the information in the second media stream is synchronized.

SUMMARY OF THE INVENTION

An object of the present invention is to provide a solution for synchronizing the presentation of a first and a second media stream at a receiving terminal, which media streams are transmitted from a sending terminal, when the first media stream has a first end-to-end delay from the transmission from the sending terminal until the media stream is presented at the receiving terminal, and the second media stream has a second end-to-end delay considerably shorter than the first end-to-end delay.

The above object is achieved by a method, a system and a computer program product set forth in the characterizing part of the independent claims.

The above object is achieved by presenting the first media stream at the sending terminal, delayed, from the transmission of the first media stream from the sending terminal, with a time dependent on the difference between the first end-to-end time delay and the second end-to-end time delay. Thereby, any comments, e.g. by speech, from the user of the sending terminal to the first media stream will be transmitted as a second media stream delayed approximately with the time dependent on the time difference of the different end-to-end delays. By this measure, the first and the second media streams are presented approximately synchronized to the user of the receiving terminal. As an example, the user of the receiving terminal will see a part of a video sequence, and at substantially the same time hear the voice comments of the user of the first terminal to the same part of the video sequence.

The invention also comprises, in preferred embodiments, methods for estimating the first and the second end-to-end delays.

An advantage of the present invention is that it provides a fairly simple solution for synchronizing the presentation at a receiving terminal of two different media streams transmitted from a sending terminal to the receiving terminal.

A further advantage is that it provides end users of combinational services with a better end user experience.

BRIEF DESCRIPTION OF THE DRAWINGS

The invention will in the following be described in more detail with reference to enclosed drawings, wherein.

DETAILED DESCRIPTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
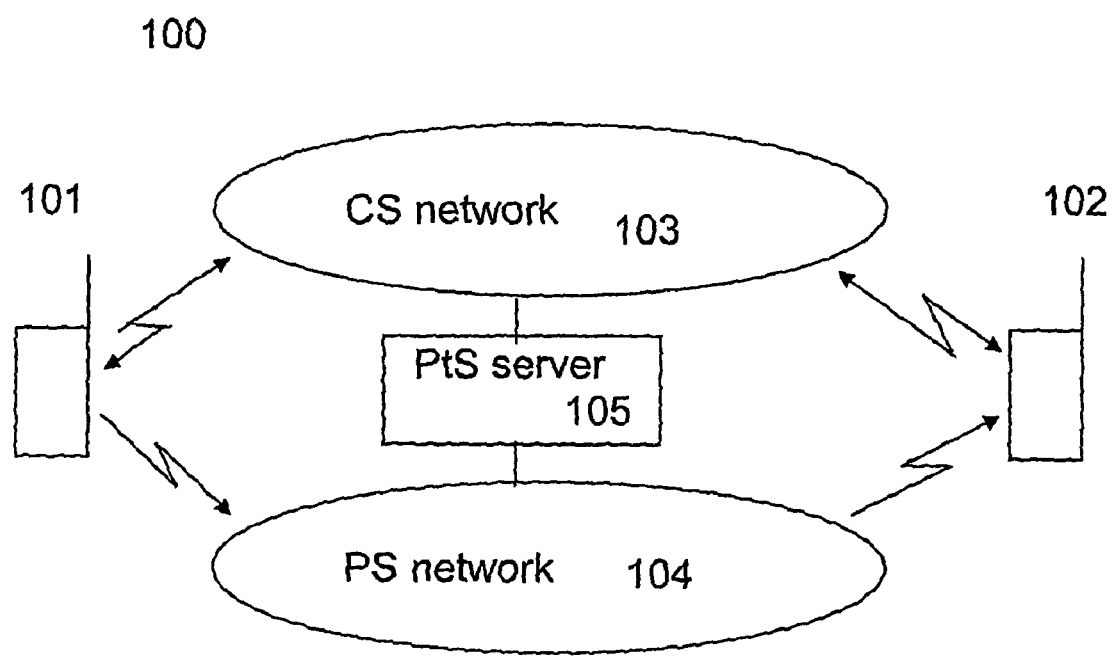
FIG. 1 shows an example of a mobile communication environment wherein the present invention can be used.

FIG. 1 describes an exemplary mobile communication system 100 wherein the present invention can be used. The figure is only on a schematic level, and can involve other networks as well. In an example of the invention, a first terminal 101 and a second terminal 102 are engaged in a voice conversation over a circuit switched network 103, which voice conversation would be a duplex communication, which means that voice streams can be sent both from the first terminal to the second terminal and vice versa. This is illustrated by the two-way arrows from the terminals to the circuit switched network. The first terminal and the second terminal belong to different Push to Show (PtS) Users, which means that they are enabled to use Push to Show services. Push to Show services have been described in more detail earlier in this document. During the voice call, the user of the first terminal starts to record a video which is transmitted live, i.e. streamed, via a packet switched network 104 to the second terminal 102. Since the first terminal transmits the video to the second terminal, the first terminal is further on called a sending terminal and the second terminal is further on called a receiving terminal. A PtS server 105 in the communication system enables the simultaneous transmission of voice and video. Since the voice streams and the video stream use separate transmission channels, and have different buffering times in the receiving terminal, there will be different end-to-end time delays in the voice streams compared to the video stream. Typically, the end-to-end time delay of a voice stream would be approximately 0.2 seconds whereas the end-to-end time delay of the video stream would be approximately 1.5-2 seconds. Thereby, a comment from the user of the sending terminal, regarding a part of the recorded video, will be received around 1.5 seconds before that part of the video is presented at the receiving terminal. This would be rather annoying for the user of the receiving terminal.

A solution to this problem would be to somehow synchronize the presentation of the video stream and the voice stream from the sending terminal at the receiving terminal. It is, however, hard to lower the end-to-end delay of the video stream over the PS network 104 since the PS network may be able to allow retransmissions of lost PS data blocks over the radio interface. It is also a bad idea to increase the end-to-end delay of the CS voice, since that will be perceived as annoying by the participants in the CS-call.

Therefore, according to this invention, it is proposed to start presenting the video stream for the recording user on the screen of the sending terminal with a certain time delay from the start of transmission of the video stream to the receiving terminal. This time delay is chosen to be dependent on the time difference between the end-to-end delay of the video stream and the end-to-end delay of the voice stream. According to one preferred embodiment of the invention, this time delay is chosen as an estimation of the end-to-end time delay of the video stream subtracted with an estimation of the end-to-end time delay of the voice stream. This gives the recording user the ability to synchronize his comments with the delayed video presented to him. Thereby the receiving user, i.e. the user of the receiving terminal, will receive the video stream synchronized with the voice stream, such that, at the receiving terminal, the voice comments from the user of the sending terminal are commenting the same video pictures as are currently being presented.

The invention is not limited to the PtS Video case, but could be used in all communication services that involve at least two media streams that are not synchronized to each other. According to the invention, the media stream with the highest transmission delay will be presented on the sending terminal delayed, from the start of the transmission of that media stream, with a time dependent on the time difference between the end-to-end time delays of the different media streams.

Some more examples of communication services where the invention could be used are:

PtS Clip, where a CS voice conversation or a PS voice conversation is enriched by progressive download of a video previously stored in the terminal of the sending PtS user;

PtS whiteboard, where a CS voice conversation or a PS voice conversation is enriched by a whiteboard presented on the involved terminals.

Another example where the invention may be used is for streaming video combined with PS voice.

As mentioned, the media stream with the longest end-to-end time delay, i.e. the video stream, is presented at the sending terminal during the transmission of the video stream to the receiving terminal but delayed, compared with the transmission of the media stream, with a time delay that corresponds to the time difference between the first (long) and the second (short) end-to-end time delay. According to an exemplary embodiment, the video stream is presented at the sending terminal delayed an amount of time that corresponds to its end-to-end delay, i.e. transfer delay plus buffering delay. In this exemplary embodiment, the end-to-end time delay of the voice stream is neglected. Although, the end-to-end time delay of the voice stream can be subtracted from the estimated end-to-end time delay of the video stream.

In order to estimate the end-to-end delay of the video stream, the following method can be used:

Sending a data packet from the sending terminal to the receiving terminal, a data packet to which a reply is requested;

Recording a first time when this data packet is sent;

Recording a second time when the requested reply is received;

Subtracting the first time from the second time;

Optionally, subtracting a possible waiting time that the receiving terminal has waited from receiving the transmitted data packet until it sent a reply to the sending terminal. In this case the receiving terminal has to report the waiting time in e.g. the reply.

Dividing the result of the subtracting calculation by two, to get the one way delay rather than the round trip delay; and Adding, to the result of the division calculation, a current buffer delay in the receiving terminal, which buffer delay is measured at the receiving terminal and transmitted to the sending terminal, e.g. in the reply mentioned above.

The end-to-end time delay of the second media stream, e.g. the voice stream, can be estimated using the same method as described or any other method. Typically, if the second media stream is voice, a default value is used for the end-to-end time delay of the second media stream or this second end-to-end time delay is neglected.

Figure 2:
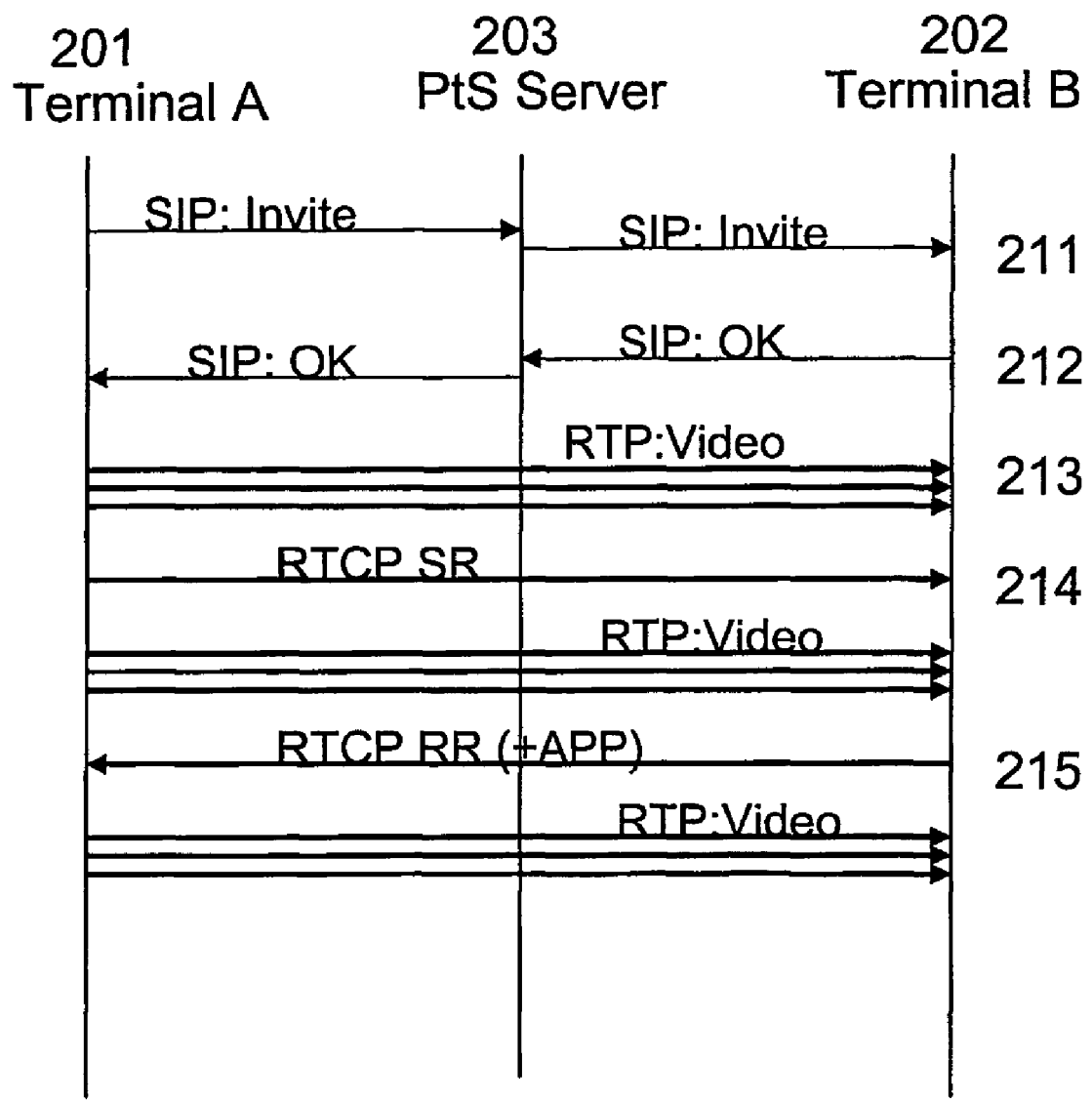
FIG. 2 is a signalling flow diagram for estimating end to end packet switched video delay.

FIG. 2 describes a first embodiment of the invention for calculating an estimated end-to-end time delay for a media stream, wherein the media stream is live streamed video. In the embodiment, Real Time Control Protocol (RTCP) messages used in video streaming are used for estimating the end-to-end video delay, i.e. data transfer delay+buffering delay. A signalling flow diagram describing how terminal A performs this estimation is presented in FIG. 2.

A Real Time Protocol (RTP) session is set up between terminal A and terminal B by sending Session Initiation Protocol (SIP) messages between terminal A and terminal B via a PtS Server 203. First, a SIP Invite message 211 is sent from terminal A to terminal B, inviting terminal B to set up an RTP session with terminal A. Terminal B responds with a SIP OK message 212. When the RTP session has been set up between Terminal A and Terminal B, RTP:Video packets are sent 213 from terminal A to terminal B. Also, RTCP Sender Reports (SR) and RTCP Receiver reports (RR) and potentially RTCP APP (Application specific) packets are exchanged between the terminals. The RTCP SR and the RTCP RR may be sent once every second. The same can be said regarding the potential APP packets.

In the first embodiment for calculating an estimated time delay for the video stream, the following steps will take place, (the numeral values mentioned below are only exemplary):

1. At time 200 ms according to the Network Time Protocol (NTP) clock that runs in terminal A, terminal A 201 sends 214 an RTCP SR to terminal B 202. Note that terminal A sends RTCP SR since it is the terminal A that currently sends live-streamed video. The RTCP SR sent contains a Last Sender Report (LSR) field in which the time 200 ms is carried.

2. The terminal B receives the RTCP SR at time 1000 ms according to terminal B's NTP clock. Note that terminal A's and terminal B's NTP clocks do not have to be synchronized. After 300 ms (terminal B's NTP time 1300 ms), terminal B sends 215 an RTCP RR, and potentially also an RTCP APP packet to terminal A. The RTCP RR or the RTCP APP packet contains a Delay since Last Sender Report (DLSR) field. In this field a value of 300 ms is carried. The RTCP RR or the RTCP APP packet also contains the amount of time of buffered video that currently is in the jitter buffer of the terminal B. In this example the amount of time of buffered video is 1000 ms.

The PtS terminal A receives the RTCP RR and potentially the RTCP APP packets at terminal A's NTP time 1100 ms. By subtracting the LSR and the DLSR values the terminal A calculates the round-trip delay of the PS data channel: 1100 ms−200 ms−300 ms=600 ms. According to one embodiment, the delay is assumed to be equal for the forward path and the reverse path for the PS data. Then terminal A calculates the one way transfer delay by simply dividing the round-trip delay of the PS data channel by 2: 600 ms/2=300 ms.

According to another embodiment, if terminal A has knowledge about differences in the delay in the forward path and the reverse path for the PS data channel, the terminal A may use that information to calculate the one way transfer delay. Also, other radio network feedback information could also be used to estimate the forward path delay. Such information may be given by the Session Description Protocol (SDP), in the session set-up, or measured by some sort of media bandwidth adaptation scheme. SDP is a protocol that describes which media and bandwidth that is to be used during the session. By having the one way transfer delay, the total end-to-end delay for the live-streamed video is found by adding the received buffer delay in the RTCP RR or the APP packet: 300 ms+1000 ms=1300 ms. In the end, the video stream shown at terminal A can be delayed by 1300 ms to synchronize it with the live-streamed video played back at terminal B. Thereby, at terminal B, the voice comments from user A will be presented approximately synchronized with the video stream from user A. Alternatively, to get an even more synchronized presentation, the terminal A may estimate or assume an end-to-end delay for the CS-voice and subtract that as well. In that case, if terminal A assumes a CS delay of 250 ms, the video will be delayed: 1300−250=1050 ms instead of 1300 ms.

Figure 3:
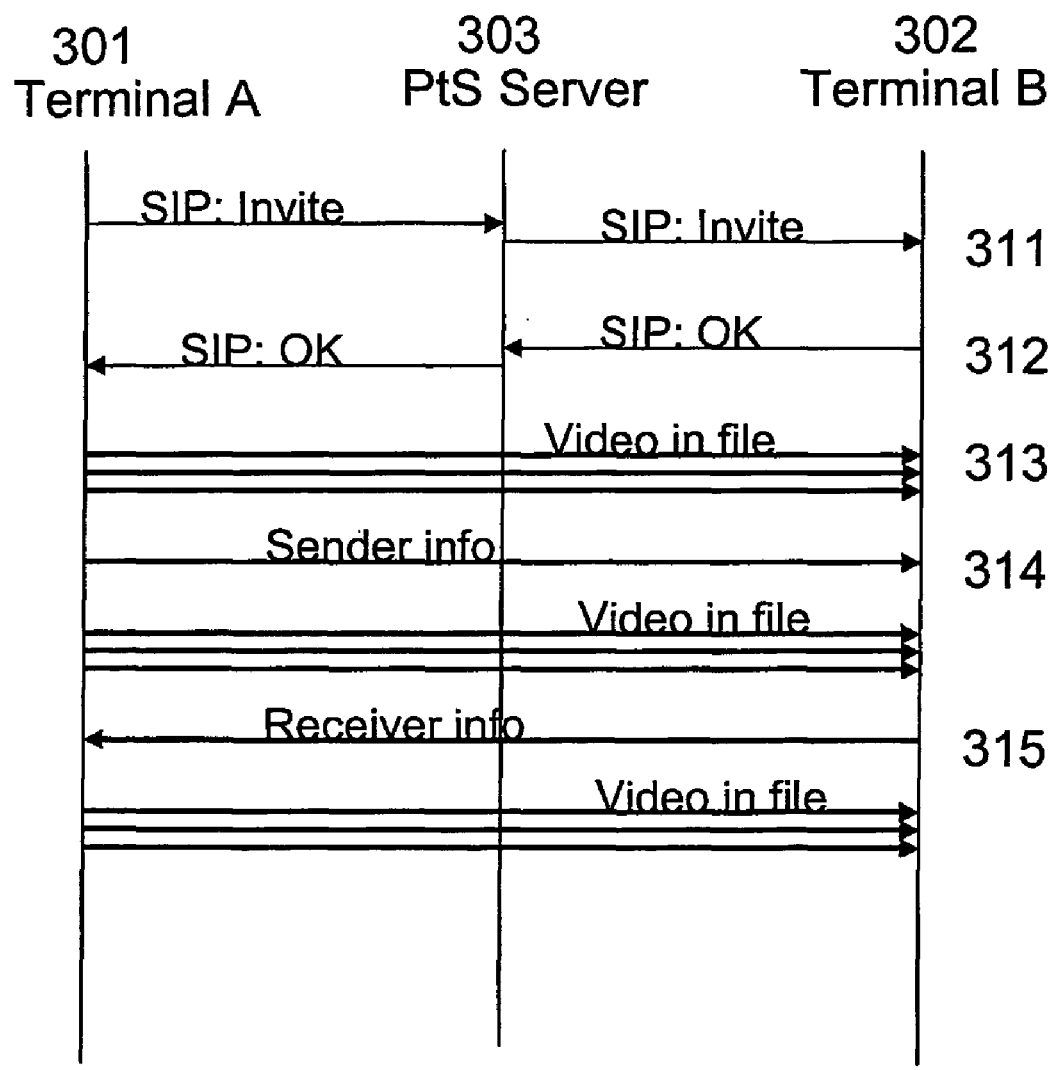
FIG. 3 is another signalling flow diagram for estimating end to end packet switched video delay, this time for a progressively downloaded file.

FIG. 3 describes a second embodiment of the invention for calculating an estimated end-to-end time delay for a media stream, in this case a progressively downloaded video file. To be able to do this, terminal A estimates the end-to-end delay for the video, i.e. the one way transfer delay+the buffering delay until the file is started to be played out. A flow describing how the terminal A does this is presented in FIG. 3. The solution presented in FIG. 3 does not use a specified protocol such as RTP in FIG. 2, for calculating the end-to-end delay. Although, a protocol such as Message Session Relay Protocol (MSRP) could be used.

A session is set up between terminal A 301 and terminal B 302 by sending Session Initiation Protocol (SIP) messages between terminal A and terminal B via a PtS Server 303. First a SIP Invite message 311 is sent from terminal A to terminal B inviting terminal B to set up an RTP session with terminal A. Terminal B respond with a SIP OK message 312. After the session has been setup between terminal A and terminal B, media packets are sent 313 from terminal A to terminal B (Video in file). Also, packets including sender info and receiver info are exchanged between terminal A and terminal B.

The terminal A sends 314 a packet with sender information to the terminal B, which packet is marked so that the terminal A can get a response to that specific packet. The packet may be a special media packet or a Sender Info packet, equivalent to the RTCP SR in the solution of FIG. 2. The terminal B responds to the packet with sender information by sending 315 a packet with receiver information. The content of the packet with receiver information may be the time it has taken from the terminal B has received the packet with sender information until it responded to the packet with e.g. a Receiver Info packet. In case of direct acknowledgments no such time indication has to be given. In this case zero delay is assumed. In the case that the terminal B always responds after a given amount of time known by the terminal A, also no such time indication has to be given.

The packet with receiver information also comprises either a pointer that describes what portion of the file that currently is presented at terminal B's display, i.e. a file index, and/or the buffer status at the terminal B, i.e. a buffer delay.

In the end, the terminal A remembers the time it sent the packet with sender information, that the received packet with receiver information relates to, and calculates the end-to-end delay based on the information received in the packet with receiver information, in a similar way as described in connection with FIG. 2. If the packet with receiver information comprises a pointer, terminal A has to calculate the end-to-end time delay by: Comparing e.g. the file index indicated by the pointer with a second file index that describes what portion of the file that is currently transmitted from terminal A, indicated e.g. with a pointer at the terminal A; subtracting the file index from the second file index, and eventually subtracting the transmission time for transmitting the file index to terminal A. Thereafter, the video stream shown at terminal A's display is delayed by the calculated end-to-end delay, possibly subtracted with an estimated time delay for the CS-voice, such that the progressively downloaded video will be displayed at terminal B's display substantially synchronized with the reception of the voice comments of the user of terminal A.

Figure 4:
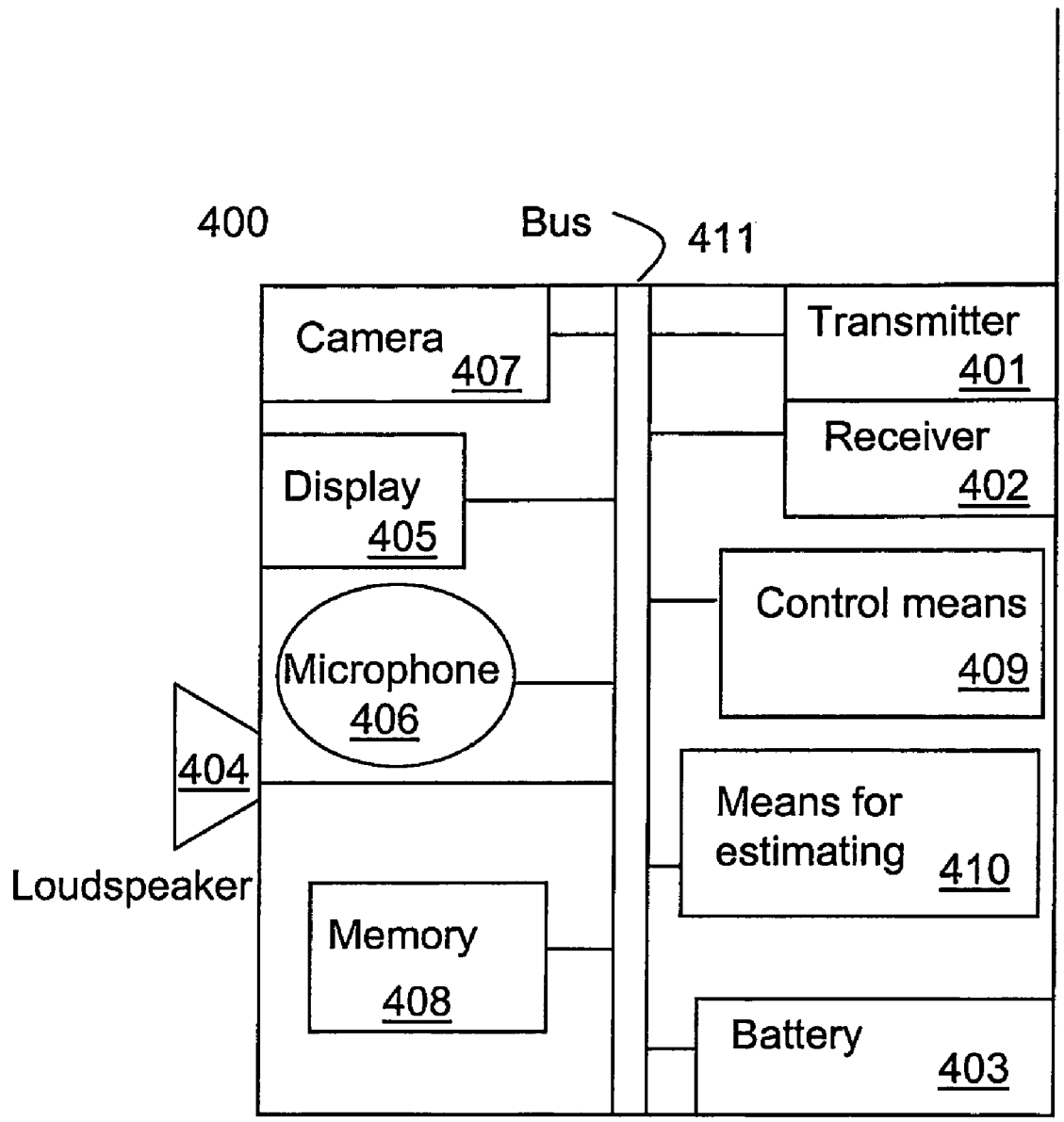
FIG. 4 shows a mobile terminal according to the invention.

FIG. 4 describes a terminal according to the invention arranged for transmitting a first and a second media stream to a receiving terminal over separate transmission channels. The first and the second media streams are transmitted partly simultaneously to the receiving terminal. The first media stream is associated with a first end-to-end time delay, whereas the second media stream is associated with a second end-to-end time delay that is smaller than the first end-to-end time delay.

The terminal 400 comprises a transmitter 401 for transmitting the first and the second media stream. The transmitter may comprise two different parts, one for transmitting the first media stream and another for transmitting the second media stream, e.g. a GPRS transmitter for transmitting packet data such as streamed video and a GSM transmitter for transmitting voice. The terminal also comprises:

- a receiver 402 for receiving media streams from other terminals or nodes in the communication system;
- a battery 403 for supplying the terminal with electric power;
- a loudspeaker 404 for presenting sound to a user of the terminal, e.g. the voice of a user of another terminal with which the user of terminal 400 is involved in a voice call;
- a display 405 for presenting text and pictures to the user of the terminal;

a microphone 406 for receiving speech from the user of the terminal;

a camera 407 for taking pictures or films;

a memory 408 for storing data, such as the pictures or films taken by the camera, a processor for controlling the functions of the terminal, and a communication bus 411 for facilitating communication between the different units in the terminal.

According to the invention, the terminal also comprises control means 409 for controlling the presentation of the first media stream to a user of the terminal, e.g. at the display of the terminal. This control means 409 is arranged to present the first media stream at the terminal 400 delayed with a time dependent on the time difference between the first and the second end-to-end time delay. More precisely, the presentation of the first media stream to the user of the terminal is delayed, compared to the transmission of the first media stream to the receiving terminal, with a time dependent on the time difference between the first and the second end-to-end time delay. The time dependent on the time difference between the first and the second end-to-end time delay would preferably be approximately the same as the time difference between the first and the second end-to-end time delay. Thereby, a second media stream initiated by the user of the terminal as a result of the delayed presentation of the first media stream, will be transmitted delayed with approximately the same time delay compared to the first media stream and, consequently, arrive at the receiving terminal approximately synchronised with the first media stream, due to the difference in end-to-end time delay for the first and the second media streams. This principle will be illustrated with the following example:

The user of the terminal is engaged in a voice call, which is a duplex communication, with a user of another terminal. Then, during the voice call, the user of the terminal starts transmitting a video clip stored in the memory 408, to the other terminal, hereinafter called a receiving terminal. The transmission of the video clip is initiated, by pressing a button on a key board of the terminal, and the video clip is transmitted as a video stream from the terminal to the receiving terminal. The video clip will be presented at the display 405, controlled by the control means 409, such that it is started to be presented delayed from the start of the transmission of the video stream with a time which is approximately the time difference of the end-to-end time delays of the video stream and a voice stream. The user of the terminal will look at the delayed video stream presented on his display and comment the delayed video stream via the microphone 406. Because the video stream is presented with a delay to the user of this terminal, his comments will be started to be transmitted as a voice stream from the transmitter 401, delayed, from the start of the transmission of the video stream, with approximately the time difference of the end-to-end time delays of the video stream and the voice stream. Thereby, the user of the receiving terminal will see the video stream at his display approximately synchronized with the comments of the user to the video stream heard through his loudspeaker. As a result, voice communication between the users of the two terminals will be facilitated since the two users will talk about approximately the same part of the video.

For this reason, according to an embodiment of the invention, the terminal also has means 410 for estimating end-to-end time delays, which may be arranged to estimate the first end-to-end time delay and the second end-to-end time delay. The means 410 for estimating and the control means 409 could be arranged in the processor of the terminal.

The means for estimating end-to-end time delays may further be arranged for estimating the first end-to-end time delay by estimating a transfer time for transmitting a data packet of the first media stream from the terminal to the receiving terminal and arranged for estimating a buffering time, which is the time from the moment when the receiving terminal receives the data packet to the moment when the data packet is presented at the receiving terminal. This may be accomplished by the means for estimating by receiving data from the receiving terminal regarding the different times, data which is used to estimate the transfer time and the buffering time.

The means for estimating end-to-end time delays may according to another embodiment of the invention be arranged for:

Recording a first time when a data packet to which a reply is requested is transmitted from the sending terminal to the receiving terminal;

Recording a second time when the reply is received at the sending terminal from the receiving terminal, Subtracting the first time from the second time;

Optionally, subtracting, from the result of the subtraction, a possible waiting time that the receiving terminal has waited from receiving the transmitted data packet until the reply was sent to the sending terminal;

Dividing the result of the subtracting calculation by two; and

Adding, to the result of the division calculation, a current buffer delay in the receiving terminal, which buffer delay is measured at the receiving terminal and transmitted to the sending terminal.

According to an embodiment of the invention, the first media stream may be presented at the sending terminal delayed with a time dependent on the time difference between the first and the second end-to-end time delay added with an offset time value. This offset value may be positive or negative, for example it may be + or −0.5 seconds. According to one embodiment the first media stream may be presented on the first terminal delayed with a time that is the estimated first end-to-end time delay subtracted with the second end-to-end time delay added with the offset value.

According to the invention, the user of the terminal may decide whether or not he wants to use the inventive feature, i.e. whether or not the first media stream should be presented at his terminal delayed with a time dependent on the time difference between the first and the second end-to-end time delay. Therefore, the terminal 400 may be arranged to receive information from the user of the terminal, via e.g. the microphone 406 or a keyboard (not shown), regarding whether or not the user of the phone wants to use the inventive feature or not. If the user indicates that he does not want to use this feature, the terminal is arranged to switch off the feature.

Another example wherein the present invention can be used is when the user of the terminal records a video which is streamed live to his friend's receiving terminal. In this case the live streamed video can be presented on the display 405 of the terminal, with a delay that is approximately the difference of the end-to-end time delay for the video and the end-to-end time delay of voice. This can be done on the display 405 by splitting the display such that it shows the delayed version of the video in one window in addition to the live camera video shown in another window. If the user comments the delayed version of the live streamed video, his comments will be presented at the receiving terminal's loudspeaker approximately simultaneously as the streamed video. Another possibility for visualization on the display is that only the delayed version of the video is shown. The visualization used could be fixed in the application or selected by the user. For the PtS whiteboard communication service described above, another visualization option is available: Drawings on the whiteboard could appear immediately on the display of the sending terminal, but with a light colour, dashed lines, or similar. Once the user of the receiving terminal can se the drawings, the colour turns darker/lines turn solid.

In some cases, the estimated time difference between the first and the second end-to-end time delay is low. In such a case it may not be beneficial to apply the method according to the invention for synchronizing the presentation of a first and a second media stream at the receiving terminal. For that reason, according to an embodiment of the invention, a time difference threshold can be applied. If the estimated time difference is lower than a certain threshold value, no synchronization according to the invention will be applied. Therefore, the control means in the terminal described in FIG. 4 may further be arranged to compare the time difference between the first and the second end-to-end time delay to such a threshold value, and to present the first media stream at the terminal (400) delayed with the time dependent on the time difference between the first and the second end-to-end time delay only if the time difference is greater than the threshold value.

Due to e.g. the transport protocols used, it may take a certain amount of time until a good estimation of the end-to-end delays are calculated or estimated. In that case, according to an embodiment of the invention, a default initial delay value is used for delaying the presentation of the first media stream at the sending terminal. This default initial delay value may range from 0 ms to several seconds. It may be a typical value for the difference between a typical time delay of a first media stream subtracted with a typical time delay of a second media stream. The default delay value may, according to one embodiment of the invention, be used during an initial time, such that only a first number of data packets of the first media stream are presented delayed with the default value, and the following number of data packets of the first media stream are presented delayed with a value dependent on an estimation of the difference between the first and the second end-to-end time delay. This initial time may be defined as either a certain number of data packets presented, wherein the number of packets that have been presented are counted in e.g. the controller, or as a certain time from presenting the first data packet.

According to another embodiment of the invention, the default value may be a typical value of the time difference between an end-to-end time delay of a certain type of first media stream and an end-to-end time delay of a certain type of second media stream. If such a default value exists, it can also be used as the delay time for delaying the presentation of the entire first media stream.

According to another embodiment of the invention, the invention may be a computer program product comprising a computer program stored on a carrier, for example a CD, a diskette, or a carrier frequency over which the computer program is transmitted, etc. The computer program is loadable into a memory of a digital computer device residing in the sending terminal, wherein the computer program comprises software code portions for performing the method of the invention when the computer program is run on the computer device.

Even though the invention has mainly been described in the case when a first and a second media stream are transmitted from one terminal to another terminal, it should be understood that the invention might as well be used for sending a first and a second media stream to more than one terminal. For example, the invention may be used when a user of a terminal being engaged in a conference call with many other users, wants to send a video to the terminals of the other users. In such a case, the presentation of the video to the user of the sending terminal may be delayed with approximately the average of the difference in end-to-end time delay between the video and the voice at the different receiving terminals. Alternatively, the presentation of the video at the sending terminal may be delayed with approximately the highest end-to-end time delay difference. In these cases, according to one embodiment, the time differences for the transmission to all involved receiving terminals are estimated, such that the average time delay difference can be calculated, or the highest time delay can be identified, respectively.

Another example where the invention is useful is in a conference call, when the conference call is enriched with a whiteboard transmitted from one terminal to all other terminals, or to some of the terminals involved in the conference call.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for synchronizing the presentation of a first and a second media stream at a receiving terminal in a mobile communication system, the method comprising:
    transmitting the first media stream from a sending terminal;
    presenting the first media stream at the sending terminal delayed from the transmission of the first media stream with a time dependent on an time difference between a first and a second end-to-end time delay;
    wherein the first media stream and the second media stream are transmitted separately but at least partly simultaneously from the sending terminal to the receiving terminal;
    wherein the first media stream is built up from data packets, which data packets are transmitted consecutively from the sending terminal to the receiving terminal and presented consecutively at the receiving terminal, wherein the first media stream is associated with the first end-to-end time delay and the second media stream is associated with the second end-to-end time delay;
    wherein the first end-to-end time delay is larger than the second end-to-end time delay, wherein the end-to-end time delays are defined as the time from transmitting a part of a media stream from the sending terminal until that part of the media stream is presented at the receiving terminal;
    wherein the first media stream is presented at the sending terminal delayed with a default value that is selected to be a typical value of the time difference between the first and the second end-to-end time delay, and
    wherein the default value is used to delay only a first number of data packets of the first media stream, and wherein the following number of data packets of the first media stream are presented delayed with a value dependent on an estimation of the difference between the first and the second end-to-end time delay.

2. The method according to claim 1, further comprising estimating the first end-to-end time delay.

3. The method according to claim 2, further comprising estimating the second end-to-end time delay and presenting the first media stream at the sending terminal delayed with a time which is the estimated first end-to-end time delay subtracted with the estimated second end-to-end time delay.

4. The method according to claim 2, wherein the step of estimating the first end-to-end time delay comprises:
  estimating a transfer time for transmitting a data packet of the first media stream from the sending terminal to the receiving terminal;
  estimating a buffering time defined as from the moment when the receiving terminal receives the data packet to the moment when the data packet is presented on the receiving terminal, and
  adding the estimated transfer time to the estimated buffering time.

5. The method according to claim 2, wherein the step of estimating the first end-to-end time delay comprises:
  recording a first time when a data packet to which a reply is requested is transmitted from the sending terminal to the receiving terminal;
  recording a second time when the reply is received at the sending terminal from the receiving terminal;
  subtracting the first time from the second time;
  optionally, subtracting, from the result of the subtraction, a possible waiting time that the receiving terminal has waited from receiving the transmitted data packet until the reply was sent to the sending terminal;
  dividing the result of the subtracting calculation by two; and
  adding to the result of the division calculation, a current buffer delay in the receiving terminal, which buffer delay is measured at the receiving terminal and transmitted to the sending terminal.

6. The method according to claim 1, wherein the second media stream is voice and the first media stream is video.

7. The method according to claim 1, wherein the sending terminal receives information from a user of the sending terminal regarding whether or not the first media stream should be presented at the sending terminal delayed with the time dependent on the time difference between the first and the second end-to-end time delay, and wherein the sending terminal acts according to such information.

8. The method according to claim 1, wherein the default value is dependent on earlier estimations of the time difference for other media streams belonging to the same categories as the first or the second media stream.

9. The method according to claim 1, wherein the time difference between the first and the second end-to-end time delay is compared to a threshold value, and the first media stream is only presented at the sending terminal delayed with the time dependent on the time difference between the first and the second end-to-end time delay if the time difference is higher than the threshold value.

10. The method according to claim 1, wherein the step of presenting further comprises presenting the first media stream at the sending terminal delayed from the transmission of the first media stream with a time dependent on the time difference between the first and the second end-to-end time delay added with an offset value.

11. A terminal in a mobile communication system arranged for transmitting a first and a second media stream to a receiving terminal, wherein the terminal comprises a transmitter arranged for transmitting the first and the second media stream separate from each other, but at least partly simultaneously, wherein the first media stream is built up from data packets, which data packets are to be transmitted consecutively and presented consecutively at the receiving terminal, wherein the first media stream is associated with a first end-to-end time delay and the second media stream is associated with a second end-to-end time delay, and wherein the first end-to-end time delay is larger than the second end-to-end time delay, wherein an end-to-end time delay is defined as the time from transmitting a part of a media stream until that part of the media stream is presented at the receiving terminal, the terminal further comprises:
  control means arranged for presenting the first media stream at the terminal delayed from the transmission of the first media stream with a time dependent on the time difference between the first and the second end-to-end time delay, wherein the control means is further arranged to present the first media stream at the terminal delayed with a default value that is selected to be a typical value of the time difference between the first and second end-to-end time delay, wherein the terminal is further arranged for using the default value to delay only a first number of data packets of the first media stream, and for presenting following number of data packets of the first media stream delayed with a value dependent on an estimation of the difference between the first and the second end-to-end time delay; and
  means for estimating end-to-end time delays arranged for estimating the first end-to-end time delay.

12. The terminal according to claim 11, wherein the means for estimating is further arranged to estimate the second end-to-end time delay and wherein the control means is further arranged to present the first media stream at the sending terminal delayed with a time which is the estimated first end-to-end time delay subtracted with the estimated second end-to-end time delay.

13. The terminal according to claim 11, wherein the means for estimating is further arranged for:
  estimating a transfer time for transmitting a data packet of the first media stream to the receiving terminal;
  estimating a buffering time defined as from the moment when the receiving terminal receives the data packet to the moment when the data packet is presented on the receiving terminal; and
  adding the estimated transfer time to the estimated buffering time.

14. The terminal according to claim 11, wherein the means for estimating is further arranged for estimating the first end-to-end time delay by:
  recording a first time when a data packet to which a reply is requested is transmitted to the receiving terminal;
  recording a second time when the reply is received from the receiving terminal,
  subtracting the first time from the second time;
  optionally, subtracting, from the result of the subtraction, a possible waiting time that the receiving terminal has waited from receiving the transmitted data packet until the reply was sent to the terminal;
  dividing the result of the subtracting calculation by two, and;
  adding to the result of the division calculation, a current buffer delay in the receiving terminal, which buffer delay is measured at the receiving terminal and transmitted to the terminal.

15. The terminal according to claim 11, wherein the second media stream is voice and the first media stream is video.

16. The terminal according to claim 11, further arranged to receive information from a user of the terminal, information regarding whether or not the first media stream should be presented at the sending terminal delayed with the time dependent on the time difference between the first and the second end-to-end time delay, and wherein the terminal is further arranged to act according to such information.

17. The terminal according to claim 11, wherein the default value is dependent on earlier estimations of the time difference for other media streams belonging to the same categories as the first or the second media stream.

18. The terminal according to claim 11, wherein the control means is further arranged for comparing the time difference between the first and the second end-to-end time delay to a threshold value, and for presenting the first media stream at the terminal delayed with the time dependent on the time difference between the first and the second end-to-end time delay only if the time difference is higher than the threshold value.

19. The terminal according to claim 11, wherein the control means is further arranged for presenting the first media stream at the terminal delayed from the transmission of the first media stream with a time dependent on the time difference between the first and the second end-to-end time delay added with an offset value.

20. A computer program product comprising a computer program stored on a non-transitory computer readable medium, wherein the computer program is loadable into a memory of a digital computer device residing in the sending terminal, wherein the computer program comprises software code portions for performing the method according to claim 1 when the computer program is run on the computer device.

* * * * *